Dec. 6, 1966  J. O. POISSON  3,289,812
CONVEYOR SYSTEM
Filed May 13, 1965  2 Sheets-Sheet 1
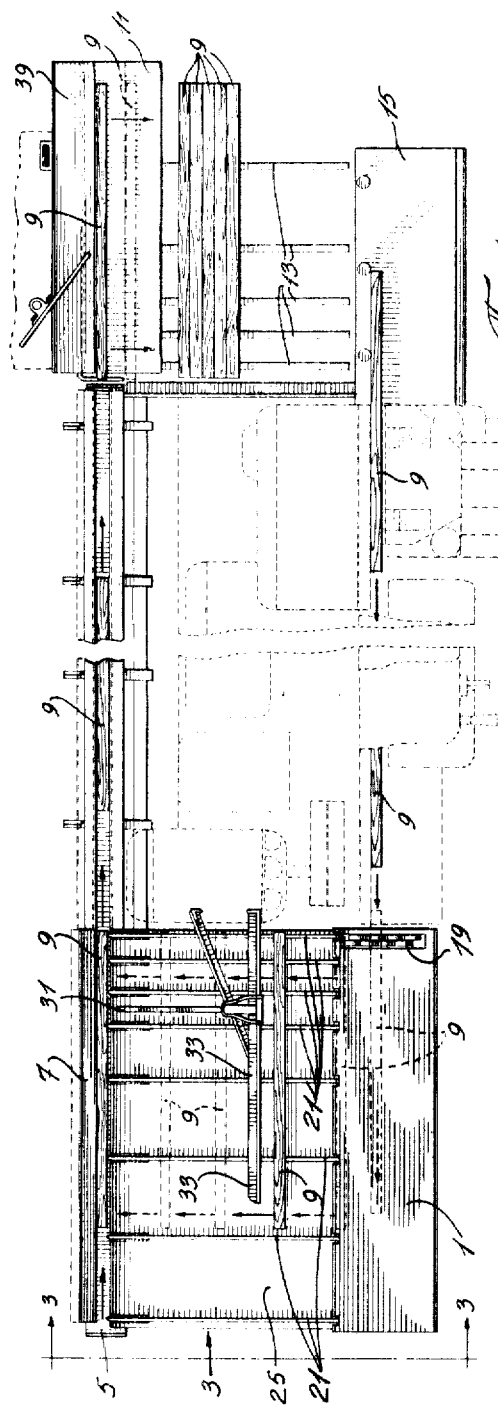
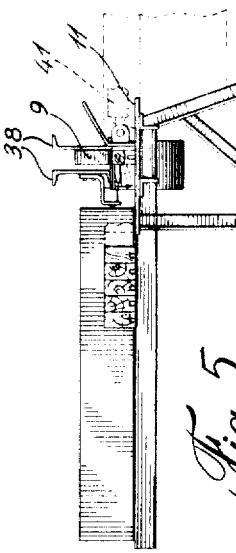
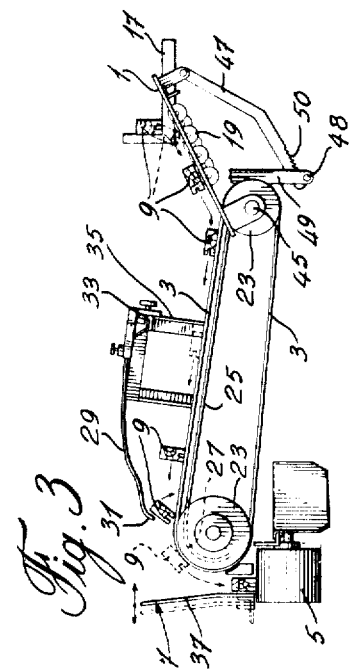
INVENTOR
Joseph O. POISSON
BY
ATTORNEYS Dec. 6, 1966   J. O. POISSON   3,289,812
CONVEYOR SYSTEM Filed May 13, 1965   2 Sheets-Sheet 2

INVENTOR
Joseph O. POISSON
BY
ATTORNEYS

United States Patent Office 3,289,812
Patented Dec. 6, 1966

3,289,812
CONVEYOR SYSTEM
Joseph O. Poisson, Victoriaville, Quebec, Canada, assignor to Victoriaville Furniture Limited, Victoriaville, Quebec, Canada
Filed May 13, 1965, Ser. No. 455,483
10 Claims. (Cl. 198—45)

The present invention generally relates to new and useful improvements in conveyor systems and more specifically to an improved conveyor system for use in connection with woodworking machines.

The invention finds useful application in the operation of planers where the surfaces of boards are planed square or in the case of machines for making generally elongated moldings and particularly where the boards have to be returned to the machine two or more times for completion. In prior art installations of this type, the boards had to be carried by hand from the output to the input of the machine. Furthermore, the boards had to be placed edgewise on the inlet to be readily fed into the machine. This of course meant that at least one additional workman was necessary since the operator could not be relied upon to do this transfer work if the machine had to be operated efficiently.

It is consequently a prime object of this invention to provide a machine which can automatically and without manual handling transfer the boards from the outlet of the machine to the inlet thereof efficiently and rapidly.

Another object of the invention lies in providing such a conveyor system whereby the boards are always carried according to a proper alignment whereby not to interfere with one another and are received at the inlet end of the machine edgewise and in facing relationship longitudinally thereof so as to be ready for feeding into the machine.

Yet another object of the invention lies in the provision of such a machine that will receive boards continuously and transfer them automatically from outlet to inlet of the machine.

The above-mentioned objects may be obtained with a conveyor system according to the invention which generally comprises an inclined apron on which the flat members or boards are received to be displaced in a predetermined direction; a first conveyor disposed at an angle to the said predetermined direction; a vertical hopper overlying said first conveyor for receiving the flat members edgewise; a second conveyor disposed longitudinally of the predetermined direction and having a receiving end at the bottom of the apron and a discharging end at the upper end of the hopper whereby the members may be discharged from the second conveyor to the first conveyor to stand edgewise thereof. In order to transport the boards to the inlet end of the machine, the conveyor system of the invention preferably includes a discharging apron at the end of and below the first conveyor; a pusher plate over the discharging apron extending in the direction of the inlet and offset from the first conveyor; means to move the plate over the discharging apron to push the flat members toward the said inlet end of the machine.

It is believed that a better understanding of the invention will be afforded by the description that follows of a preferred embodiment having reference to the appended drawings wherein:

FIG. 1 is a general plan view of the conveyor system of the invention showing the general arrangement of the various individual conveyors;

FIG. 3 is an end elevation view of the part of the system shown in FIG. 2;

FIG. 5 is an end elevation view of the inlet part of the system shown in FIG. 4.

FIG. 1 illustrates, in shadow lines, the woodworking machine which need not be described as it is not part of the invention. The conveying system of the invention is shown in full lines.

Figure 2:
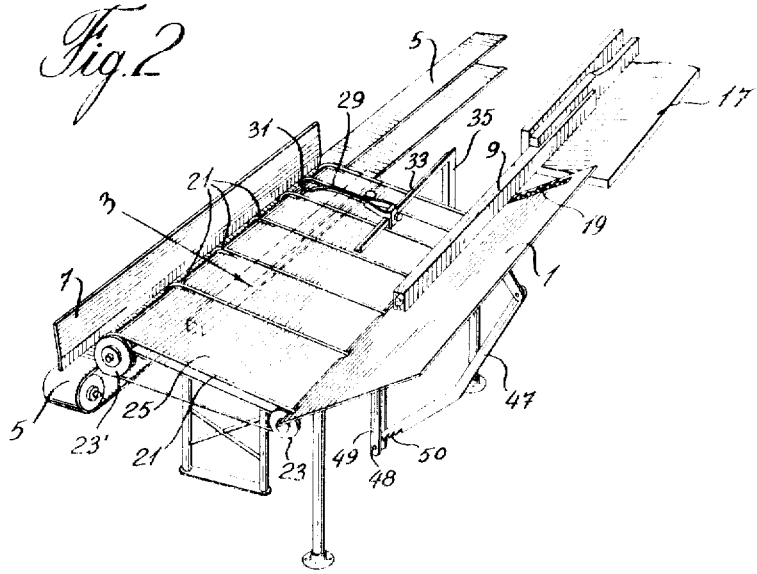
FIG. 2 is a perspective view of that part of the system located at the outlet of the woodworking machine.

Generally, the system of the invention comprises an inclined receiving apron 1 discharging into a slightly upwardly inclined first conveyor 3 which in turn discharges into a second conveyor 5 located below the first conveyor 3 and extending generally at right angles thereto. Conveyor 5 drives the boards 9 rearwardly toward the inlet end of the machine and onto a generally horizontal discharge apron 11 wherefrom the boards 9 are driven on a fork like table 13 where they are picked by the machine operator and placed on the feeding bed 15.

Now for a detailed description of the conveyor system.

As shown in FIGS. 2 and 3, the boards 9 are pushed out of the machine by sliding over the outlet bed 17 and are retained thereon by the cutting device of the machine so as to overhang the inclined receiving apron 1 in the manner shown in FIG. 2. The boards 9 eventually drop over apron 1 and it will be appreciated that because of the hot condition in which they are, they would tend to partially stick to the surface of apron 1 which would usually be a smooth metal plate. Also, it is possible that the boards would set on apron 1 at an angle relative to the general direction of displacement and in order to avoid their sticking to plate 1 and to straighten them up, the invention proposes the use of friction reducing means along an inclined edge of apron 1 at the receiving end thereof, the friction reducing means intended to raise the corresponding head end of boards 9 above apron 1 whereby to prevent sticking and also to cause slightly faster motion of the board end lying thereon whereby to straighten them in relation to the direction of displacement.

In the preferred form of the invention, the said friction reducing means are a series of freely rotatable rollers 19 having at least a portion thereof projecting above the surface of the apron. The axis of rotation of these rollers is of course normal to the general direction of displacement of the boards.

Boards 9 are directed toward the slightly inclined first conveyor 3 which is preferably formed of a series of parallel flexible belts 21 winding around a plurality of sheaves 23, 23' at the ends of first conveyor 3. It will be noted that the spacing of flexible belts 21 becomes wider in the direction away from the outlet bed 17 whereby to accommodate boards of various lengths. Also, a protective metal shield 25 is mounted beneath belt 21 to wind around sheaves 23', as at 27 (FIG. 3) as a precautionary measure to avoid boards from getting caught in between the sheaves and the belt.

It will of course be understood that any other type of traveling conveyor would be suitable but it has been noted that the above type is particularly useful in that it is cheaper and more easily serviced when worn out.

As shown in FIGS. 2 and 3, means is provided over first conveyor 3 to cause any board 9 standing on edge to fall flat thereover for a purpose to be determined hereinafter. This means comprises a rigid arm 29 having a bent free end 31 standing slightly higher above conveyor 3 than the said members when the latter lay flat. The end of arm 29 away from free end 31 is displaceably mounted on the horizontal member 33 of a bracket 35 fixed alongside conveyor 3 to the supporting structure thereof.

As will be noted from FIG. 3, sheaves 23' act in the manner of a drum and direct boards 9 over the previously mentioned second conveyor 5 horizontally disposed at substantially right angles to conveyor 3.

In order to force boards 9 edgewise on conveyor 5, a hopper 7, previously mentioned, is provided which includes a vertical hopper plate 37 displaceable relative to the drum formed by sheaves 23 whereby to accommodate various thicknesses of boards 9. In the instance shown herein, the drum formed by sheaves 23' constitutes the other side of hopper 7. In some installations where the boards may have substantial width, it may be advisable or necessary to provide a second plate parallel to plate 37 and tangent to sheaves 23'.

Figure 4:
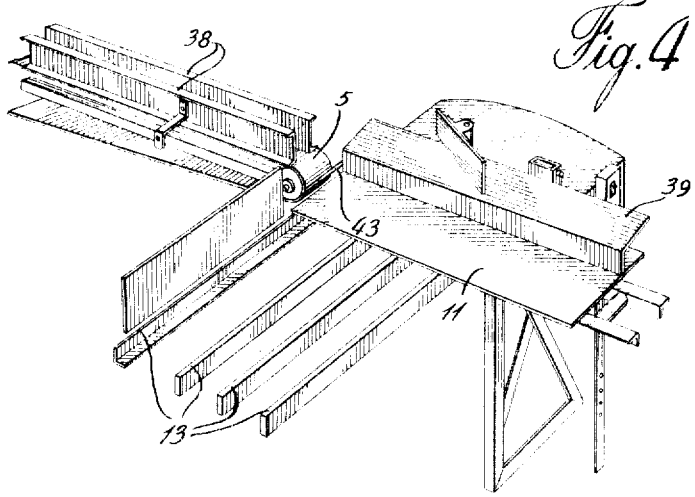
FIG. 4 is a perspective view of that part of the system located at the inlet end of the machine.

From hopper 7, boards 9 are directed by second conveyor 5 in a narrow passageway shown in FIG. 4 and formed of a pair of spaced channel members 38 serving to retain the boards edgewise.

Now, in reference to FIGS. 4 and 5, it will be seen that boards 9 are driven from conveyor 5 on the previously mentioned discharge apron 11 standing generally at the inlet end of the machine as shown in FIG. 1. Apron 11 is at a lower level than the top of conveyor 5 and has a vertical pusher plate 39 mounted thereover which is to be displaced transversely thereon by any suitable means such as a reciprocating piston 41 shown in dotted lines in FIG. 5.

An actuating member 43, in the shape of a pin or rod, is mounted for displacement immediately forwardly of the outlet of conveyor 5 and between the surface of apron 11 and the top surface of conveyor 5. It will be understood that actuating member 43 will be acted on by a board 9 only when the latter falls completely over the discharge apron 11. At that time, the actuating member will energize the reciprocating piston 41 that will cause lateral displacement of pusher plate 39 to force the board over the previously mentioned fork like table 13. Boards 9 will gradually pile up on table 13 edgewise and ready to be fed into the woodworking machine again.

With reference to FIG. 3 again, it will be seen that the inclination of receiving apron 1 may be varied by pivotally mounting the lower end thereof on shaft 45 of sheave 23 while the upper end is retained in position by means of a retaining element 47 having indentations or teeth 50 engageable over a pin 48 disposed between the two spaced members of a support 49 fixed to the frame of the conveyor system.

Although a specific embodiment has just been described, it will be understood that various modifications may be made thereto within the spirit of the invention, the scope of which is to be construed from the appended claims.

I claim:

1. A conveyor system for the transportation of flat members, said system comprising:
    (a) an inclined apron on which said members are received to be displaced in a predetermined direction generally along the inclination of said apron;
    (b) a first conveyor disposed to travel longitudinally of said predetermined direction and having a receiving end at the bottom of said apron and a discharging end;
    (c) a second conveyor disposed beneath said first conveyor at the discharging end thereof to travel at an angle to said first conveyor;
    (d) a vertical hopper overlying said second conveyor and disposed to receive and guide said flat members from the discharge end of said first conveyor; said hopper of a width to force said members edgewise on said second conveyor, and;
    (e) means, over said first conveyor, to cause any member standing on edge to fall flat thereover.

2. A conveyor system as claimed in claim 1, wherein said apron is provided along a lateral inclined edge thereof with friction reducing means to reduce friction between said apron and said members when sliding thereon.

3. A conveyor system as claimed in claim 2, wherein said friction reducing means is a plurality of rollers for rolling one end of said members along said direction; a portion at least of said rollers projecting above the surface of said apron.

4. A conveyor system for the transportation of generally flat elongated members along a first direction and then along a second direction generally at right angles to said first direction, said system comprising:
    (a) an apron inclined in said first direction for the reception of said flat members generally transversely of said first direction and across an inclined edge of said apron;
    (b) friction reducing means along said inclined edge to reduce friction between said apron and said members when sliding thereon;
    (c) a first conveyor disposed longitudinally of said first direction and having a receiving end at the bottom of said apron and a discharging end including a conveyor guiding drum;
    (d) a second conveyor along said second direction disposed at substantially right angles to said first direction and below said drum;
    (e) a vertical hopper overlying said second conveyor for receiving said flat members edgewise from said first conveyor, and
    (f) means, over said first conveyor, to cause any member standing on edge to fall flat thereover.

5. A conveyor system as claimed in claim 4, wherein said last-named means comprises an arm adjustably mounted over said first conveyor and having an end standing slightly higher than said members, when lying flat.

6. A conveyor system as claimed in claim 4, wherein said friction reducing means is a plurality of rollers for rolling one end of said members along said direction; a portion at least of said rollers projecting above the surface of said apron.

7. A conveyor as claimed in claim 4, wherein said hopper includes said drum as one side thereof and a straight wall parallel thereto and spacedly adjustable relative thereto.

8. A conveyor system for the transportation of generally flat elongated members along a first direction and then along a second direction generally at right angles to said first direction, said system comprising:
    (a) an apron inclined in said first direction for the reception of said flat members generally transversely of said first direction and across an inclined edge of said apron;
    (b) friction reducing means along said inclined edge to reduce friction between said apron and said members when sliding thereon;
    (c) a first conveyor disposed longitudinally of said first direction and having a receiving end at the bottom of said apron and a discharging end including a conveyor guiding drum;
    (d) a second conveyor along said second direction disposed at substantially right angles to said first direction and below said drum;
    (e) a vertical hopper overlying said second conveyor for receiving said flat members edgewise from said first conveyor;
    (f) means, over said first conveyor, to cause any member standing on edge to fall flat thereover;
    (g) a discharging apron at the end of and below said second conveyor;
    (h) a pusher plate over said discharging apron extending in said second direction and offset from said second conveyor;

(i) means to move said plate over said discharging apron to push said flat members in a direction normal to said second direction.

9. A conveyor system as claimed in claim 8, wherein said plate moving means includes an actuating member projecting in the path of said flat members as they move from said second conveyor to said discharging plate.

10. A conveyor system as claimed in claim 8, wherein said friction reducing means is a plurality of rollers for rolling one end of said members along said direction; a portion at least of said rollers projecting above the surface of said apron.

References Cited by the Examiner

UNITED STATES PATENTS 756,551   4/1904   Abraham _____ 198—85

EVON C. BLUNK, *Primary Examiner.*

RICHARD E. AEGERTER, *Examiner.*